(12) United States Patent
Kawakami (10) Patent No.: US 9,061,385 B2
(45) Date of Patent: Jun. 23, 2015

(54) CLAMP DEVICE

(75) Inventor: Takayuki Kawakami, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 846 days.

(21) Appl. No.: 13/261,111

(22) PCT Filed: Jun. 11, 2010

(86) PCT No.: PCT/JP2010/059961
§ 371 (c)(1),
(2), (4) Date: Dec. 29, 2011

(87) PCT Pub. No.: WO2011/004678
PCT Pub. Date: Jan. 13, 2011

(65) Prior Publication Data
US 2012/0098180 A1      Apr. 26, 2012

(30) Foreign Application Priority Data
Jul. 9, 2009    (JP) .................................. 2009-162722

(51) Int. Cl.
*B23Q 3/00*    (2006.01)
*B23Q 3/08*    (2006.01)
*B23Q 1/00*    (2006.01)

(52) U.S. Cl.
CPC ..................................... *B23Q 1/009* (2013.01)

(58) Field of Classification Search
CPC .......... B23Q 1/009; B23Q 1/032; B23Q 1/28; B25B 5/061; B25B 5/065
USPC ........ 269/20, 48.1, 309, 310, 24, 27, 28, 228, 269/289 R, 32
See application file for complete search history.

(56) References Cited

U.S. PATENT DOCUMENTS

| 6,095,509 A | 8/2000 | Yonezawa |
| 7,168,695 B2 * | 1/2007 | Yonezawa et al. ............ 269/309 |
| 7,303,186 B2 * | 12/2007 | Yonezawa et al. ............ 269/309 |
| 2006/0049568 A1 | 3/2006 | Yonezawa |
| 2006/0273504 A1 | 12/2006 | Yonezawa |

FOREIGN PATENT DOCUMENTS

| DE | 40 20 981 | 1/1992 |
| JP | 11-188511 | 7/1999 |
| JP | 2004-195583 | 7/2004 |
| JP | 2004-209607 | 7/2004 |
| JP | 35-50010 | 8/2004 |
| WO | WO-2005/030435 | 4/2005 |
| WO | WO-2007/074737 | 7/2007 |

* cited by examiner

*Primary Examiner* — Lee D Wilson
*Assistant Examiner* — Seahee Yoon
(74) *Attorney, Agent, or Firm* — Jordan and Hamburg LLP (57) ABSTRACT

A clamp device has a gripping member which is expandable and contractible and is inserted into an aperture in a workpiece and grips the aperture, a clamp rod including a tapered shaft portion that fits into the gripping member, and a drive means for driving the clamp rod forwards and backwards. Provided is a support mechanism that supports the gripping member by fluid pressure when the gripping member is radially expanded, and a fluid pressure release means that releases the fluid pressure of the support mechanism after radial expansion of the gripping member when the clamp rod is driven by the drive means to perform clamping. The support mechanism has an annular pressure reception member that supports the gripping member, and a supporting fluid chamber that causes fluid pressure in the direction opposite to the clamping direction to be received on the annular pressure reception member.

17 Claims, 7 Drawing Sheets

CLAMP DEVICE

BACKGROUND OF THE INVENTION

The present invention relates to a clamp device that engages gripping claws of a gripping member into an aperture in a workpiece and pulls the workpiece against a clamp main body so as to clamp it, and in particular relates to a clamp device that can strengthen the clamping force while ensuring its support function for supporting the gripping member.

A clamp device of the above described type (i.e. a so called hole clamp or expansion clamp) is employed in cases such as when performing machining on the upper surface of a workpiece or the upper surface of the outer peripheral portion of a workpiece, since it is not possible to employ a clamp device of the type that applies pressure with a pressure member on the end portion of the workpiece from above. With this clamp device, a seating surface is defined on the clamp main body for seating the workpiece that is to be the subject of clamping, and, when the workpiece is to be mounted, by loading it on the seating surface and supporting it thereby, by inserting into an aperture in the workpiece a gripping member that grips the inner circumferential surface of the aperture in the workpiece and a clamp rod that has a tapered shaft portion inserted into this gripping member, and by pulling the clamp rod towards the seating surface by the force of hydraulic pressure or of a compression spring of a clamp drive means, the gripping member is expanded radially by the tapered shaft portion and is engaged with the inner circumferential surface of the aperture, and then the workpiece is fixed to the seating surface by further pulling this gripping member towards the seating surface. Clamp devices of this type are described in Patent Documents #1 and #2.

With the clamp devices of Patent Documents #1 and #2 described above, as a support mechanism that supports the gripping member from below, there are provided with an annular support member that supports the lower end of the gripping member, and a compression spring member that biases this annular support member upwards. Here, if the support force caused by the compression spring is insufficient, then when the clamping operation starts the gripping member will not grip the inner circumferential surface of the aperture, and will slip downwards. For this reason, as the compression spring that generates the support force, it is necessary to employ a spring capable of generating a support force that is rather large.

In some cases, as a support mechanism that differs from the support mechanism described above, there are provided with an annular pressure reception member that supports the lower end of the gripping member, and a hydraulic chamber that applies hydraulic pressure to the lower end portion of an annular cylindrical portion of this annular pressure reception member.

Patent Document #1: Japanese Patent Publication 3,550,010;

Patent Document #2: German Patent Publication 4,020,981.

With the support mechanisms of the clamp devices of the above Patent Documents #1 and #2, since support force is generated by the compression spring and biases the gripping member in the unclamping direction both during the unclamped state and during the clamped state, accordingly the clamping force is reduced by just the amount of this support force. For this reason it is not possible to strengthen the clamping force up to the maximum clamping force which can be developed by the clamp drive means, or even almost up to this maximum clamping force.

If, as a support mechanism, there are provided with an annular pressure reception member that supports the lower end of the gripping member, and a hydraulic chamber that applies hydraulic pressure to the lower end portion of an annular cylindrical portion of the annular pressure reception member, then it is often the case that the clamping hydraulic chamber that drives the clamp rod also is employed for generating the hydraulic pressure for the annular pressure reception member. With this structure as well, since before the start of the clamping operation a hydraulic pressure (i.e. a support force) acts on the annular pressure member in the opposite direction to the clamping force, accordingly the clamping force is diminished by just the amount of this support force. For this reason, it is not possible to strengthen the clamping force up to the maximum clamping force that can be developed by the clamp drive means, or even up to almost this maximum clamping force.

SUMMARY OF THE INVENTION

The object of the present invention is to provide a clamp device in which the gripping member is supported by fluid pressure during radial expansion of the gripping member, and that can release all or a part of this fluid pressure after radial expansion of the gripping member.

The clamp device of the present invention includes a clamp main body, a gripping member which is expandable and contractible in a radial direction and is inserted into an aperture in a workpiece and grip an inner circumferential surface of the aperture, a clamp rod including a tapered shaft portion fitted into and engaged with said gripping member, and a drive means for driving said clamp rod forwards and backwards, and is characterized by further comprising: a support mechanism that supports said gripping member by fluid pressure during radial expansion of said gripping member; and a fluid pressure release means that, when said clamp rod is driven by said drive means to perform clamping, releases all or a part of the fluid pressure of said support mechanism after radial expansion of said gripping member.

According to the present invention, when the gripping member is radially expanded, not only is it possible to perform this radial expansion reliably while supporting the gripping member with the fluid pressure in the support mechanism, but also since, when driving the clamp rod to perform clamping, all or a part of the fluid pressure in the support mechanism is released after the radial expansion of the gripping member, accordingly it is possible to strengthen the clamping force by the amount of the fluid pressure that has been released, so that it is possible to enhance the reliability of the clamp device.

In addition to the structure of the present invention as described above, it would be acceptable to arrange also to employ various other structures, as explained below.

(1) The support mechanism may comprise an annular pressure reception member that supports a base end of said gripping member, and a supporting fluid chamber that applies fluid pressure to an annular cylindrical portion of the annular pressure reception member in a direction opposite to a clamping direction. Since, according to this structure, the support mechanism comprises the annular pressure reception member and the supporting fluid chamber that applies fluid pressure to the annular cylindrical portion of the annular pressure reception member in the direction opposite to the clamping direction, accordingly this constitutes a support mechanism that supports the gripping member with fluid pressure.

(2) The drive means may comprise a clamping fluid chamber for driving said clamp rod in the clamping direction, and an unclamping fluid chamber for driving said clamp rod in an unclamping direction; and the supporting fluid chamber may consist of a dedicated supporting fluid chamber formed independently from the clamping fluid chamber. Since, according to this structure, the drive means comprises the clamping fluid chamber and the unclamping fluid chamber and the supporting fluid chamber consists of the dedicated supporting fluid chamber formed independently from the clamping fluid chamber, accordingly, by venting the fluid pressure in the dedicated supporting fluid chamber, it becomes possible to release all of the fluid pressure supplied to the support mechanism, so that it is possible to strengthen the clamping force by yet a further level.

(3) The drive means may comprise a clamping fluid chamber for driving the clamp rod in the clamping direction, and an unclamping fluid chamber for driving the clamp rod in the unclamping direction; and the supporting fluid chamber may consist of a dedicated supporting fluid chamber formed independently from the clamping fluid chamber, and the clamping fluid chamber. Since, according to this structure, the drive means comprises the clamping fluid chamber and the unclamping fluid chamber, and the supporting fluid chamber consists of the dedicated supporting fluid chamber formed independently from the clamping fluid chamber and the clamping fluid chamber, accordingly, by venting the fluid pressure in this dedicated supporting fluid chamber, it is possible to release a portion of the fluid pressure supplied to the support mechanism.

(4) The drive means may comprise a compression spring for driving the clamp rod in the clamping direction, and an unclamping fluid chamber for driving the clamp rod in the unclamping direction; and the supporting fluid chamber may consist of a dedicated supporting fluid chamber formed within the clamp main body. Since, according to this structure, the drive means comprises the compression spring that drives the clamp rod in the clamping direction and the unclamping fluid chamber, and the supporting fluid chamber consists of the dedicated supporting fluid chamber formed within the clamp main body, accordingly, by venting the fluid pressure in the dedicated supporting fluid chamber, it becomes possible to release all of the fluid pressure supplied to the support mechanism, so that it is possible to strengthen the clamping force by yet a further level. Since the clamping fluid chamber is omitted, and the compression spring is provided that drives the clamp rod in the clamping direction, accordingly the usability of the clamp device for various different purposes is enhanced, since it is possible to supply work that has been clamped to a mechanical process in a state in which the clamp device is separated from the supply of fluid pressure.

(5) There may be further provided with a fluid passage formed in the clamp main body for supplying fluid pressure to the dedicated supporting fluid chamber, and a throttling passage formed in the fluid passage. Since, according to this structure, there are provided the fluid passage that supplies fluid pressure to the dedicated supporting fluid chamber and the throttling passage that is formed in the fluid passage, accordingly it becomes possible to provide a structure that supplies fluid pressure to this fluid passage from the unclamping fluid chamber, and it becomes possible to simplify the fluid pressure circuitry. In other words, since in the unclamped state it is possible to charge fluid pressure into the dedicated supporting fluid chamber and supply the fluid pressure of the support mechanism in advance, accordingly, even though the fluid pressure in the unclamping fluid chamber is vented during the clamping operation, the reduction of fluid pressure in the dedicated supporting fluid chamber is slowed by the throttling passage, so that it is possible to ensure the fluid pressure (i.e. the support force) of the support mechanism at the initial start of clamping operation.

(6) There may be further provided with a fluid passage formed in the clamp main body for supplying fluid pressure to the dedicated supporting fluid chamber, a check valve provided in the fluid passage that permits supply of fluid pressure to the dedicated supporting fluid chamber and that prevents reverse discharge of fluid pressure, and a throttling passage that permits discharge of fluid pressure when the check valve is in the reverse flow prevention state. Since, according this structure, there are provided with the fluid passage that supplies fluid pressure to the dedicated supporting fluid chamber, the check valve provided in this fluid passage that permits supply of fluid pressure to the dedicated supporting fluid chamber, and the throttling passage that permits discharge of fluid pressure when the check valve is in the reverse flow prevention state, accordingly a similar beneficial effect is obtained as in the case of the structure (5) described above.

(7) A seating surface on which the workpiece that is to be the subject of clamping is seated may be provided at the end portion of the clamp main body in the unclamping direction, and a workpiece mounting surface may be provided to the gripping member that, during the unclamped state, is positioned more in the unclamping direction than the seating surface and moreover, during the clamping operation, is positioned at the same position as the seating surface, or more in the clamping direction than the seating surface. Since, according to this structure, there are provided with the seating surface on the end portion of the clamp main body on which the workpiece is seated, and the workpiece mounting surface on the gripping member that receives the workpiece in a higher position than the seating surface and moreover, in the workpiece clamped state, can seat the workpiece on the seating surface, accordingly it is possible to prevent the seating surface from being damaged by the workpiece, and, if a seating sensor is provided, it is possible to prevent erroneous operation of the seating sensor.

(8) There may be further provided with a fluid passage formed in the clamp main body for supplying fluid pressure to the dedicated supporting fluid chamber, a check valve provided in the fluid passage that permits supply of fluid pressure to the dedicated supporting fluid chamber and that prevents reverse discharge of fluid pressure, and a check valve opening mechanism that is operated by the annular pressure reception member and opens the check valve, when during the clamping operation the workpiece mounting surface comes to the same position as the seating surface. Since, according to this structure, there are provided with the fluid passage for supplying fluid pressure to the dedicated supporting fluid chamber, the check valve provided in the fluid passage, and the check valve opening mechanism that is operated by the annular pressure reception member and opens the check valve, when during the clamping operation the annular pressure reception member shifts integrally with the grip member by a minute distance in the clamp direction, accordingly similar beneficial effects are obtained as in the case of the structure (5) described above.

(9) And the end portion opposite to the dedicated supporting fluid chamber of the fluid passage formed in said clamp main body may be communicated with the unclamping fluid chamber. Since, according to this structure, the end portion of the fluid passage formed in the clamp main body for supplying fluid pressure to the dedicated supporting fluid chamber at its end opposite to the dedicated supporting fluid chamber is communicated with the unclamping fluid chamber, accordingly it is possible to supply fluid pressure from the unclamping fluid chamber via the fluid passage to the dedicated supporting fluid chamber, so that the fluid pressure circuitry becomes simple

DESCRIPTION OF THE PREFERRED EMBODIMENTS

In the following, embodiments for implementing the present invention will be explained on the basis of the drawings.

Embodiment 1

Figure 1:
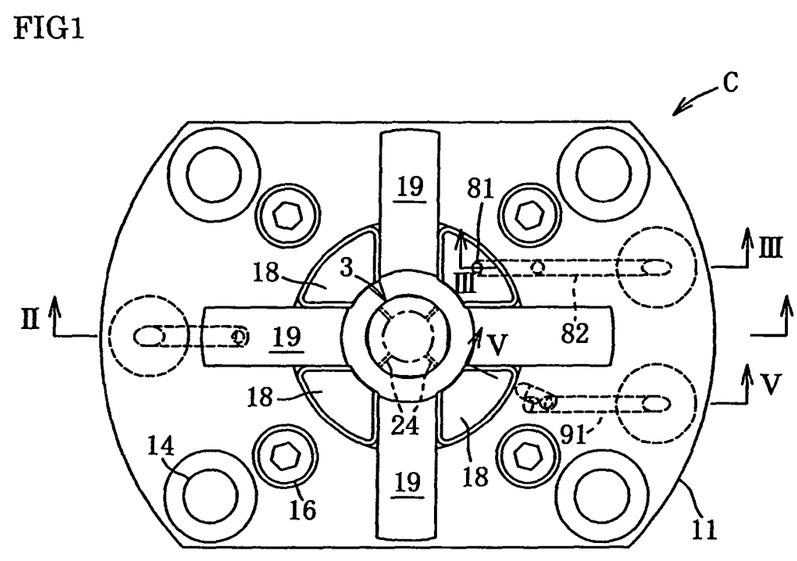
FIG. 1 is a plan view of a clamp device according to a first embodiment.
Figure 2:
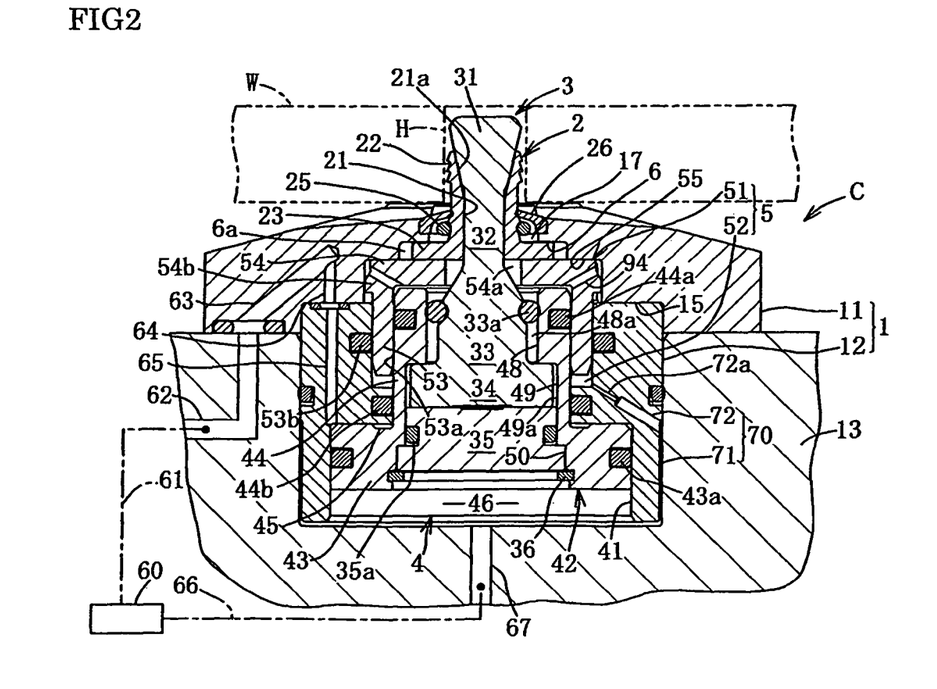
FIG. 2 is a sectional view of FIG. 1 along lines II-II.
Figure 3:
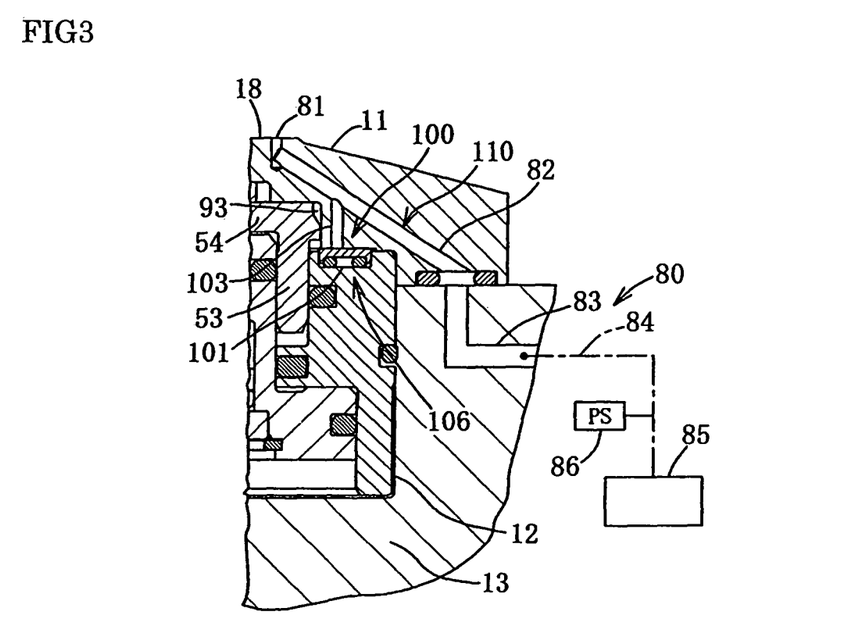
FIG. 3 is a sectional view of FIG. 1 along lines III-III.

As shown in FIGS. 1 through 3, this clamp device comprises a clamp main body 1, a gripping member 2 and a clamp rod 3 that serve as a clamp member for fixing a workpiece W, a hydraulic pressure cylinder 4 that serves as a drive means that can drive the gripping member 2 and the clamp rod 3 along their axial direction (i.e. the vertical direction), and a support mechanism 5. The clamp main body 1 includes an upper main body member 11 and a lower main body member 12, and this clamp main body 1 is fitted to a base main body member 13.

As seen in plan view, the upper main body member 11 has an almost elliptical shape, and this upper main body member 11 is fixed to the base main body member 13 with four bolts that are inserted into four bolt holes 14. The lower main body member 12 is a tubular member formed with a cylindrical aperture 41, and the upper end portion of the lower main body member 12 is fitted into a concave portion 15 on the lower surface of the upper main body member 11 and is fixed to the upper main body member 11 by four bolts 16.

As shown in FIGS. 1 through 3, the gripping member 2 is passed vertically through an aperture 17 in the center portion of the upper main body member 11. A seating surface 18 formed in the shape of a circular arc broken into four parts by four concave grooves 19 for allowing escape of pressurized air is defined at the upper end portion of the main body member 11, in the neighborhood of the external periphery of the gripping member 2. The workpiece W is seated on this seating surface 18, and is clamped there. Apart from the seating surface 18 and the concave grooves 19, the upper surface of the upper main body member 11 is formed as a partial cone having a shallow angle of slope.

The gripping member 2, which is made in an annular form from metal, is inserted into an aperture H in the workpiece W, and is adapted to be able to grip the inner circumferential surface of the aperture H. This gripping member 2 comprises a rod through hole 21 for allowing the passage of a clamp rod 3, a tubular gripping claw portion 22, and a base end flange portion 23; and the gripping member 2 is adapted to be capable of radial expansion and radial contraction by being divided by four slits 24 into four equal portions which are held together by an O-ring 25.

Teeth are formed at three levels on the outer circumferential surface of the gripping claw portion 22 of the gripping member 2, and these teeth make it easy to grip the inner circumferential surface of the aperture H formed in the workpiece W. The portion of the rod through hole 21 that corresponds to the gripping claw portion is formed as a tapered hole portion 21a with which a tapered shaft portion 31 of the clamp rod 3 closely engages.

As shown in FIGS. 1 through 3, a scraper 26 that is made from an elastic material such as rubber or synthetic resin slides in contact with the outer circumferential surface of the gripping member 2 in the aperture 17 of the upper main body member 11. The O-ring 25 is installed on the lower portion of the gripping member 2, and biases in the inward radial direction the four portions into which the gripping member 2 is divided. The base end flange portion 23 of the gripping member 2 is received within a circular concave portion 6 of the upper main body member 11, and is movably sandwiched between the upper wall portion of the circular concave portion 6 and a horizontal plate portion 54 of an annular pressure reception member 51 of a support mechanism 5. The gripping member 2 can be raised and lowered integrally with the annular pressure reception member 51 through only a small distance, and is installed so as to be shiftable, via an annular clearance 6a at the external peripheral portion of the circular concave portion 6 and via elastic deformation of the scraper 26, by approximately 1 to 2 mm in horizontal directions orthogonal to the axis of the hydraulic pressure cylinder 4.

The clamp rod 3 is an element formed as a unit from a tapered shaft portion 31, a small diameter rod portion 32, a large diameter rod portion 33, and a large diameter flange portion 34. The tapered shaft portion 31 and the small diameter rod portion 32 are passed through the rod through hole 21 in the gripping member 2. The tapered shaft portion 31 described above is formed at the upper end portion of the clamp rod 3 so as to increase in diameter upwards, and this tapered shaft portion 31 is fitted into and engaged with the tapered hole portion 21a of the gripping member 2.

As shown in FIGS. 1 through 3, the hydraulic pressure cylinder 4 is a device for driving the gripping member 2 and the clamp rod 3 forwards and backwards along their axial direction. This hydraulic pressure cylinder 4 comprises a cylindrical bore 41 formed in the lower main body member 12 and the base main body member 13 and vertically oriented, a piston member 42 installed in the cylindrical bore 41 (including a piston portion 43 and a tubular piston rod 44 that extends upwards from this piston portion 43), a clamping hydraulic chamber 45 above the piston portion 43, and an unclamping hydraulic chamber 46 below the piston portion 43.

The bottom surface of the cylindrical bore 41 is blocked by the base main body member 13. The piston member 42 is stopped by the bottom wall surface of the cylindrical bore 41 in its lower limit position. A small diameter hole 48 is formed in the upper portion of the piston member 42, a medium diameter hole 49 is formed in its intermediate portion, and a large diameter hole 50 is formed in its lower portion. A blocking member 35 is installed in the lower portion of the medium diameter hole 49 and in the large diameter hole 50, and is held therein by a stop ring 36. The external circumferential portion of the piston portion 43 is hydraulically sealed by a seal member 43a; the external circumferential portion of the tubular piston rod 44 is hydraulically sealed by seal members 44a and 44b; and the external circumferential portion of the blocking member 35 is hydraulically sealed by a seal member 35a.

The large diameter rod portion 33 of the clamp rod 3 is positioned within the small diameter hole 48, and its large diameter flange portion 34 is positioned within the medium diameter hole 49. An annular clearance 48a of approximately 2 mm is defined between the large diameter rod portion 33 and the inner circumferential surface of the small diameter hole 48, and a thick O-ring 33a (i.e. an elastic ring member) is installed in an annular groove around the external circumference of the large diameter rod portion 33, with this O-ring 33a being installed in a slightly compressed state between the large diameter rod portion 33 and the tubular piston rod 44.

The large diameter flange portion 34 is installed between the upper wall of the medium diameter hole 49 and the blocking member 35 so as to be movable in the horizontal direction. A slight clearance 49a is present between the outer circumferential surface of the large diameter flange portion 34 and the inner circumferential surface of the medium diameter hole 49. For this reason, although the clamp rod 3 is raised and lowered together with the piston member 42, it also can shift relatively with respect to the piston member 42 through a small distance in the horizontal direction orthogonal to the axis of the hydraulic pressure cylinder. The gripping member 2 can shift together with the clamp rod 3 in horizontal directions orthogonal to the axis described above. It should be understood that the scraper 26 and the O-ring 33a elastically bias the gripping member 2 and the clamp rod 3, so that the axis of the gripping member 2 and the clamp rod 3 coincides with the axis of the hydraulic pressure cylinder 4.

As shown in FIGS. 1 through 3, the support mechanism 5 is a mechanism for supporting the gripping member 2 with hydraulic pressure, when the gripping member 2 is radially expanded. This support mechanism 5 includes an annular pressure reception member 51 that supports the base end of the gripping member 2 (i.e. its lower end), and a support hydraulic chamber that applies hydraulic pressure on an annular cylindrical portion 53 of the annular pressure reception member 51, oriented in the opposite direction to the clamping direction. The annular pressure reception member 51 has the annular cylindrical portion 53 and a horizontal plate portion 54 that is connected to the upper end of the annular cylindrical portion 53, with the base end flange portion of the gripping member 2 being mounted on and supported by the upper surface of the horizontal plate portion 54. The support hydraulic chamber described above consists of a dedicated support hydraulic chamber 52.

The annular cylindrical portion 53 is installed in a tubular cylindrical aperture 53a defined by the lower main body member 12 and the tubular piston rod 44 so as to be able to slide freely in the vertical direction, and the internal circumference of the annular cylindrical portion 53 is sealed by the seal member 44a while its external circumference is sealed by a seal member 53b. A dedicated support hydraulic chamber 52, which is independent of the clamping hydraulic chamber 45, is formed at the lower end portion of the tubular cylindrical aperture 53a, and applies hydraulic pressure to the lower end of the annular cylindrical portion 53 in the upwards direction (i.e. in the direction opposite to the clamping direction). The clamp rod 3 is fitted into and passed through a circular aperture 54a in the center portion of the horizontal plate portion 54 with a certain amount of play therebetween, and an engagement stop 54b is formed on the external circumferential portion of the horizontal plate portion 54, having slightly larger diameter than the annular cylindrical portion 53.

A housing aperture 55 is formed in the upper main body member 11, continuous with the upper end of the tubular cylindrical aperture 53a. The thickness of the housing aperture 55 is greater than the thickness of the horizontal plate portion 54, by for example approximately 1.2 to 2.0 mm. The horizontal plate portion 54 is installed in the housing aperture 55 so as to be able to slide freely in the vertical direction, and the annular pressure reception member 51 is installed so as to be able to slide freely in the vertical direction by for example approximately 1.2 to 2.0 mm, in a similar manner to the horizontal plate portion 54. A gap through which pressurized air can pass is also present at the external circumference of the engagement stop 54b of the horizontal plate portion 54. The clamping hydraulic chamber 45 is connected to a hydraulic pressure supply 60 via hydraulic conduits 61 through 65, and the unclamping hydraulic chamber 46 is connected to the hydraulic pressure supply 60 via hydraulic conduits 66 and 67. It should be understood that, apart from a hydraulic pressure pump, the hydraulic pressure supply 60 also includes other necessary valves and so on.

A hydraulic conduit 70 for supplying hydraulic pressure to the dedicated support hydraulic chamber 52 comprises a tubular hydraulic conduit 71 formed on the lower half portion of the external peripheral portion of the lower main body member 12 and that communicates with the unclamping hydraulic chamber 46, and a sloping hydraulic conduit 72 formed in the lower main body member 12 at a sloping angle, with a throttling passage 72a being formed in the sloping hydraulic conduit 72. In this manner, during the unclamped state, hydraulic pressure is supplied from the unclamping hydraulic chamber 46 to the dedicated support hydraulic chamber 52, and over a predetermined quite short time period after clamping operation starts (for example, one second), the hydraulic pressure in the dedicated support hydraulic chamber 52 is discharged via the throttling passage 72a, so that the pressure in this chamber becomes equal to drain pressure.

After the clamping operation starts, the throttling passage 72a functions to delay the discharge of hydraulic pressure from the dedicated support hydraulic chamber 52, so that, after the radial expansion of the gripping member 2, all of the hydraulic pressure of the support mechanism 5 is released. It should be understood that, after the clamping operation starts, the clamping force gradually increases in correspondence to the gradual decrease of the support force, and reaches the maximum clamping force after the abovementioned predetermined quite short time period. The clamping force becomes maximum by the time that machining of the workpiece starts. The unclamping hydraulic chamber 46, the hydraulic conduits 71 and 72, and the throttling passage 72a correspond to the "fluid pressure release means" of the claims.

As shown in FIG. 3, a seating sensor 80 is provided that, in the state in which the workpiece W has been clamped, detects that the lower surface of the workpiece W has attained close contact with the seating surface 18. This seating sensor 80 comprises a pressurized air ejection hole 81 that opens to the seating surface 18, an air conduit 82 formed within the upper main body member 11 so as to communicate with the pressurized air ejection hole 81 and an air conduit 83 formed within the base main body member 13, a pressurized air supply 85 that supplies pressurized air to the air conduit 83 via the air conduit 84, and a pressure switch 86 that detects the fact that the pressure of the pressurized air in the air conduit 84 has risen to above a set pressure.

Figure 5:
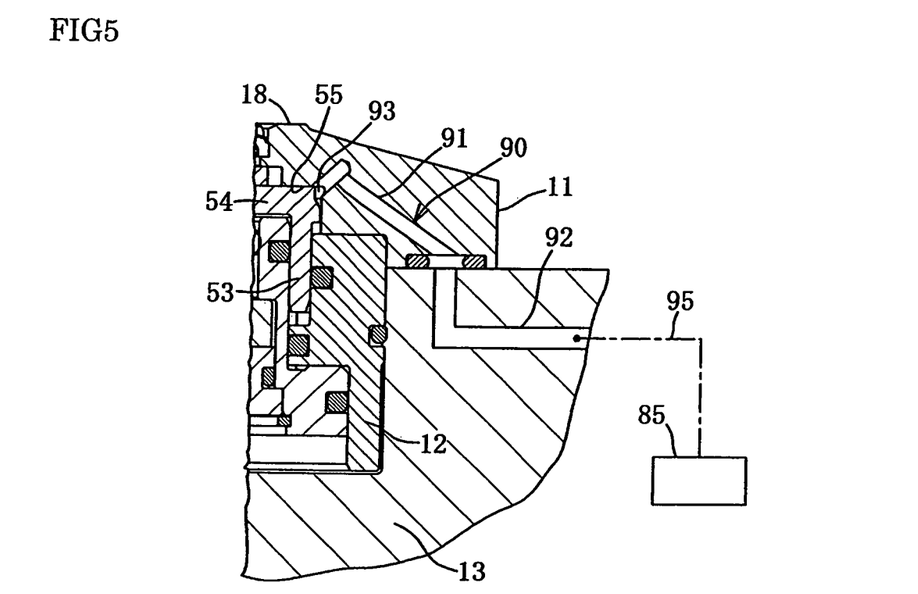
FIG. 5 is a sectional view of FIG. 1 along lines V-V.

A cleaning air conduit 90 for blowing air against the gripping member 2, the clamp rod 3, the seating surface 18 and so on for cleaning them, as shown in FIGS. 1, 2, and 5, will now be explained.

An air conduit 91, which is similar to the air conduit 82, is formed in the upper main body member 11 and connects to the housing aperture 55, and an air conduit 92 is formed in the base main body member 13 and connects to the air conduit 91, with a pressurized air supply 85 being connected to the air conduit 92 via an air conduit 95. An annular air conduit 93 is formed by reducing the diameter of the upper end portion of the external periphery of the horizontal plate portion 54 of the annular pressure reception member 51, and a plurality of air conduits 94 are formed in the horizontal plate portion 54 so as to communicate the annular air conduit 93 with the internal space within the annular pressure reception member 51. The cleaning air conduit 90 is defined by the above described air conduits 91, 92, and 95, the annular air conduit 93 of the housing aperture 65, the plurality of air conduits 94, the circular aperture 54*a*, and the four slits 24 in the gripping member 2.

Next, a clamping operation confirmation mechanism 100 that confirms whether or not clamping operation is nominal will be explained.

Figure 4:
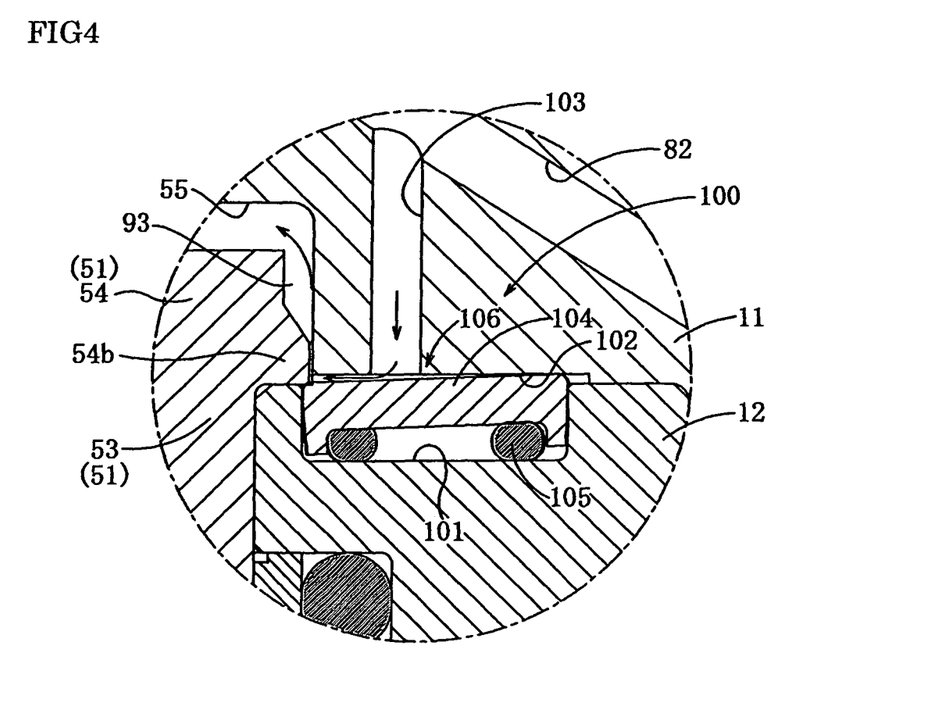
FIG. 4 is an enlarged view of an essential portion of FIG. 3.

As shown in FIGS. 3 and 4, a shallow circular concave portion 101 is formed below the air conduit 82 in the upper end portion of the lower main body member 12, and an extremely shallow circular concave portion 102 is formed in the lower surface of the upper main body member 11 so as to face the circular concave portion 101. A valve mechanism 106 is provided by a circular valve plate 104 that controls the opening and closing of an air conduit 103 that connects to the air conduit 82 being installed in these circular concave portions 101 and 102, and by O-rings 105 being installed below the lower surface of the valve plate 104 so as to bias the valve plate 104 upwards to a position in which it closes the air conduit 103. Pressurized air is supplied to the upper surface of the valve plate 104 via the air conduit 103.

In the state in which the valve mechanism 106 is open, the circular concave portion 101 is communicated with the downstream portion of the cleaning air conduit 90 via the above described annular air conduit 93 of the housing aperture 55.

Thus, in order to supply pressurized air for confirming the clamping operation, an air conduit for operation confirmation 110 is defined by the air conduits 82, 83, and 84, the air conduit 103, the circular concave portions 101 and 102, the housing aperture 55, the circular aperture 54*a*, and the four slits 24 in the gripping member 2, and is provided in the clamp main body 1 (the upper main body member 11 and the lower main body member 12) with its downstream portion being communicated with the downstream portion of the abovementioned cleaning air conduit 90. And the valve mechanism 106 that includes the valve plate 104 and the O-rings 105 is interposed part way along the air conduit for operation confirmation 110.

Figure 6:
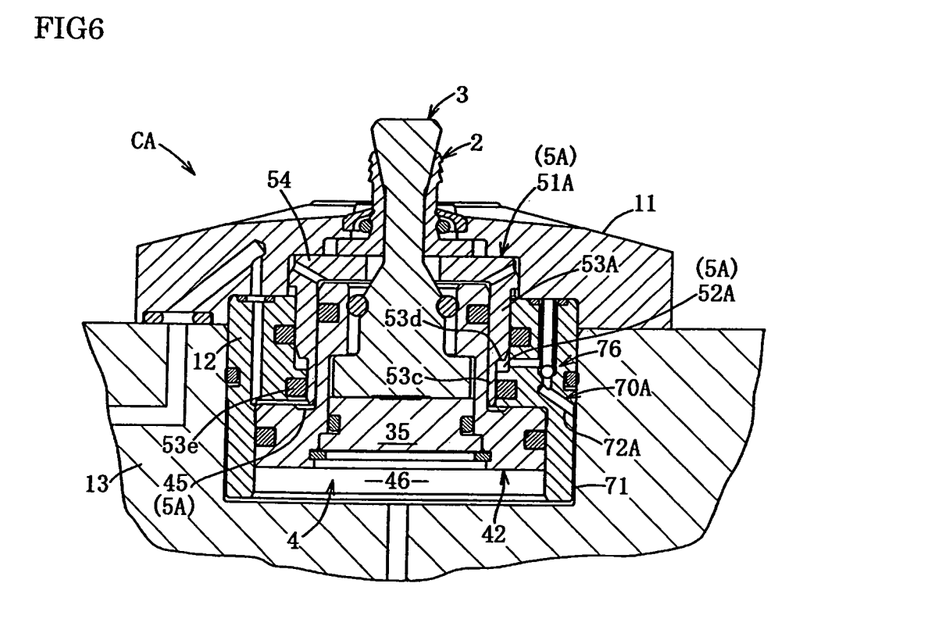
FIG. 6 is a vertical sectional view of a clamp device according to a second embodiment (corresponding to FIG. 2)

Since the circular concave portion 102 is provided, when, due to poor clamping during the clamping operation of the hydraulic pressure cylinder 4, the gripping member 2 has been retracted to its lower limit position (its limit position in the clamping direction) and the annular pressure reception member 51 has been lowered to its lower limit position, then the engagement stop 54*b* of the annular pressure reception member 51 contacts against the valve plate 104 and pushes against and moves the valve plate 104, so that the valve mechanism 106 is opened (refer to FIG. 6). In normal clamping, in the state in which the annular pressure reception member 51 is not lowered to its lower limit position, the lower end of the air conduit 103 is kept in the state of being closed by the valve mechanism 106, and, after the workpiece W has been seated, the seating sensor 80 operates normally, and the air pressure in the air conduits 82 through 84 does not drop.

However if, due to poor clamping as will be described hereinafter, the annular pressure reception member 51 is lowered to its maximum limit and the engagement stop 54*b* has pressed the valve plate 104 downwards, then the valve mechanism 106 is opened, and the pressurized air in the air conduit 103 leaks to the four slits 24 via the housing aperture 55 and the circular aperture 54*a*, and accordingly the air pressure in the air conduits 82 through 84 does not rise.

In this manner, it is possible to detect poor clamping by detecting from the detection signal of the pressure switch 86 the fact that the seating sensor 80 is not detecting seating of the workpiece W even after the clamping operation. Here, the hydraulic pressure supply 60, the air supply 85, the pressure switch 86 and so on are electrically connected to a control unit (not shown in the figures), and are controlled by that control unit. It should be understood that, if the function of the clamping operation confirmation mechanism 100 is not necessary, then it will be possible to install the valve plate 104 and the O-rings 105 to the circular concave portions 101 and 102 in the opposite order in the vertical direction.

The operation of the clamp device C described above, and the advantages that it provides, will now be explained.

When the workpiece W is to be fixed to the seating surface 18 by the clamp device C, the following procedure is performed. Initially, in the unclamped state, hydraulic pressure is supplied to the unclamping hydraulic chamber 46, and the hydraulic pressure in the clamping hydraulic chamber 45 is brought to drain pressure. When this is done, as shown in FIG. 2, the piston member 42 is elevated to its upper limit position and is held there in the stopped state. Since hydraulic pressure is supplied from the unclamping hydraulic chamber 46 to the dedicated support hydraulic chamber 52 via the hydraulic conduit 70, accordingly the annular pressure reception member 51, which receives the hydraulic pressure in the dedicated support hydraulic chamber 52, is held in its upper limit position, and the gripping member 2 is also held in its upper limit position. In this state the workpiece W is loaded, and, as shown in FIG. 2, the gripping member 2 and the clamp rod 3 are inserted into the aperture H of the workpiece W, and the workpiece W is supported by the seating surface 18.

Next, when changeover to the clamped state is to be performed, by changing over the valve of the hydraulic pressure supply, the hydraulic pressure in the unclamping hydraulic chamber 46 is brought to drain pressure, and simultaneously hydraulic pressure is supplied to the clamping hydraulic chamber 45.

At the start of this clamping operation, since due to the provision of the throttling passage 72*a* the hydraulic pressure in the dedicated support hydraulic chamber 52 does not decrease abruptly, accordingly a quite large hydraulic pressure (i.e. support force) acts on the annular pressure reception member 51 in the upwards direction. For this reason, while the annular pressure reception member 51 is held in its upper limit position in a similar manner to that described above and the gripping member 2 is also held in its upper limit position, on the other hand hydraulic pressure acts from the clamping hydraulic chamber 45 on the piston member 42 in the downwards direction, which causes the piston member 42 to be driven downwards and the clamp rod 3 to be shifted downwards relative to the gripping member 2.

As a result, the gripping claw portion 22 of the gripping member 22 is driven to expand radially by the tapered shaft portion 31 of the clamp rod 3, and thereby the gripping claw portion 22 bites into the inner circumferential surface of the aperture H in the workpiece W so as to establish the engaged state. Directly after this, the hydraulic pressure in the unclamping hydraulic chamber 26 drops to drain pressure, a large hydraulic pressure acts on the piston member 42 in the downwards direction, and the hydraulic pressure in the dedicated support hydraulic chamber 52 also drops to drain pressure with a certain time lag. Since relative shifting between the gripping member 2 and the clamp rod 3 becomes impossible after the gripping member 2 has engaged with the inner circumferential surface of the aperture H (i.e. has gripped it), accordingly the piston member 42, the gripping member 2, the clamp rod 3, and the annular pressure reception member 51 are all driven downwards integrally, so that the workpiece W is pulled strongly downwards against the seating surface 18 and the clamped state is established. In the state in which the hydraulic pressure in the dedicated support hydraulic chamber 52 has reached drain pressure, the workpiece W is in the clamped state and is held with the maximum clamping force that the hydraulic pressure cylinder 4 is capable of generating.

At this time, since a certain gap remains between the engagement stop 54b of the annular pressure reception member 51 and the lower main body member 12 as shown in FIG. 3, accordingly the valve mechanism 106 of the clamping operation confirmation mechanism 100 is kept in the closed state. For this reason, it is possible to confirm with the seating sensor 80 the fact that the workpiece W is clamped with the anticipated clamping force and is seated on the seating surface 18.

Here, since the dedicated support hydraulic chamber 52 for applying pressure to the annular pressure reception member 51 is provided independently from the clamping hydraulic chamber 45, and since abrupt decrease of the hydraulic pressure in the dedicated support hydraulic chamber 52 at the start of the clamping operation is prevented due to the throttling passage 72a, accordingly, when the gripping member 2 is radially expanded, it is possible to support the annular pressure reception member 51 and the gripping member 2 with a large hydraulic pressure (i.e., support force). And, since the hydraulic pressure in the dedicated support hydraulic chamber 52 is reduced to drain pressure in the later stage of the clamping operation (after the gripping member 2 has been radially expanded) and thereafter, accordingly the clamping force due to the hydraulic pressure (the support force) of the above described support mechanism is prevented from diminishing, and, since it becomes possible to develop the maximum clamping force within the capability of the hydraulic pressure cylinder 4, accordingly the clamping force is strengthened, and it is possible to realize a clamp device C whose reliability is excellent.

On the other hand, in a case such as one in which the workpiece W is made by casting and the diameter of its aperture H is not constant but becomes greater downwards, or if the workpiece W is made from a hard metallic material or the like, at the beginning of the clamping operation, sometimes it may happen that the gripping claw portion 22 slips downward relatively to the inner circumferential surface of the aperture H.

In this case, since the annular pressure reception member 51 is lowered to its lower limit position with the workpiece W seated on the seating surface 18, as shown in FIG. 4, the valve mechanism 106 of the clamping operation confirmation mechanism 100 is in the open state. If the valve mechanism 106 is open it is possible to detect poor clamping, since the air pressure in the air conduits 82 and 103 does not rise and the pressure switch 86 of the seating sensor 80 does not go to ON. At this time the workpiece W is in the imperfectly clamped state, and sufficient clamping force is not being generated.

On the other hand, if there is some gap between the workpiece W and the seating surface 18 when the workpiece W has been loaded, and the clamping operation has been performed in this state, then the shifting amount of the gripping member 2 that shifts until the workpiece W is seated on the seating surface 18 becomes large, and it is possible to detect this poor clamping in a similar manner to that described above, since the valve mechanism 106 of the poor clamping detection mechanism 100 is in the open state.

In a case such as one in which a workpiece W is to be clamped by a plurality of clamp devices C, if the positions of the centers of the apertures H in the workpiece W are slightly deviated due to manufacturing errors between one workpiece W and then, when the clamp rods 3 and the gripping members 2 are inserted into the apertures H, or when they are clamped, the axes of the clamp rods 3 and the gripping members 2 become somewhat deviated from the axes of the hydraulic pressure cylinders 4 due to elastic deformation of the scrapers 26 and the O-rings 33a.

However, after the workpiece W has been machined, when the clamp device C is to be changed over to the unclamped state and the workpiece W is removed, the axis of the clamp rod 3 and the gripping member 2 automatically returns due to the elastic force of the scraper 26 and the O-rings 33a, so as to coincide with the axis of the hydraulic pressure cylinder 4. For this reason, there is no necessity to perform manual actuation for the task of returning these axes to coincide with one another each time the system is returned to the unclamped state, and accordingly it is possible to enhance the working efficiency of the job of clamping the workpiece. Moreover, due to the O-rings 33a, it is possible reliably to prevent the ingress of foreign matter such as swarf or the like into the sliding region between the large diameter flange portion 34 of the clamp rod 3 and the medium diameter hole 49 of the tubular piston rod 44, and it is possible reliably to ensure smooth sliding shifting of the clamp rod 3 in directions orthogonal to the axial direction.

Since the dedicated support hydraulic chamber 52 is provided to the support mechanism 5 independently of the clamping hydraulic chamber 45, whereby it is arranged to generate hydraulic pressure (i.e. support force) to act on the lower end portion of the annular cylindrical portion 53 of the annular pressure reception member 51, accordingly, in the later stage of the clamp operation and thereafter, it is possible for the hydraulic pressure in the dedicated support hydraulic chamber 52 to be brought to drain pressure, and it is possible perfectly to release the hydraulic pressure that supports the gripping member 2. Due to this, it is possible to prevent reduction of the clamping force due to the hydraulic pressure for the support mechanism 5, and it is possible to clamp the workpiece W with the maximum clamping force of which the hydraulic pressure cylinder 4 is capable. To express this in another manner, it would also be possible to contemplate reduction of the size of this clamp device C.

Since it is arranged to supply hydraulic pressure from the unclamping hydraulic chamber 46 to the dedicated support hydraulic chamber 52 as described above, accordingly it is possible to simplify the structure of the hydraulic pressure circuitry. And, since the throttling passage 72a is provided in the hydraulic conduit 70, accordingly, when the gripping member 2 is being radially expanded, it is possible to generate the required support force due to the hydraulic pressure that remains within the dedicated support hydraulic chamber 52.

As an example in which a portion of this embodiment is altered, as shown in FIG. 6 for the second embodiment that will be described hereinafter, it would also be acceptable to arrange to provide a structure in which, to the annular cylindrical portion 53A of the annular pressure reception member 51, there are provided a thin cylindrical portion 53c formed at the internal circumferential portion of approximately the lower one third portion thereof, and an annular pressure reception surface 53d extending outwards from the periphery of the upper end of this thin cylindrical portion 53c; in which case, along with the hydraulic pressure in the dedicated support hydraulic chamber 52 being received on this annular pressure reception surface 53d, the hydraulic pressure in the clamping hydraulic chamber 45 would be received on the lower end of the thin cylindrical portion 53c.

Embodiment 2

Figure 7:
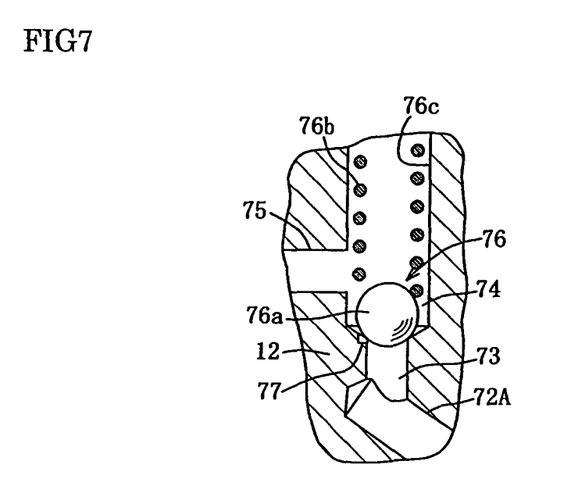
FIG. 7 is an enlarged view of the surroundings of a check valve of FIG. 6.

A clamp device CA according to the second embodiment will now be explained on the basis of FIGS. 6 and 7.

Since the structure of this clamp device CA is the same as that of the clamp device C above, with the exception of the structure of the support mechanism 5A, accordingly in the figures the same reference numerals will be appended to members that are generally the same, and explanation thereof will be omitted, with only the structures that are different being explained.

The support member 5A comprises an annular pressure reception member 51A and a support hydraulic chamber that supplies hydraulic pressure to an annular cylindrical portion 53A of this annular pressure reception member 51A in the direction opposite to the clamping direction. This support hydraulic chamber consists a dedicated support hydraulic chamber 52A and a clamping hydraulic chamber 45. The annular pressure reception member 51A comprises an annular cylindrical portion 53A and a horizontal plate portion 54 formed integrally at the upper end thereof. A thin cylindrical portion 53c is formed at the internal circumferential portion of approximately the lower one third portion of the annular cylindrical portion 53A, and the lower end of this thin cylindrical portion 53c projects into the clamping hydraulic chamber 45. And an annular pressure reception surface 53d is formed on the external circumference of the upper end of the above described thin cylindrical portion 53c of the annular cylindrical portion 53A, so as to face downwards.

A dedicated support hydraulic chamber 52A that applies hydraulic pressure to the annular pressure reception surface 53d and a clamping hydraulic chamber 45 that applies hydraulic pressure to the thin cylindrical portion 53c constitute a support hydraulic chamber that applies hydraulic pressure to the annular pressure reception member 51A. The dedicated support hydraulic chamber 52A is defined by the annular cylindrical portion 53A and the lower main body member 12, and the external periphery of the thin cylindrical portion 53c is hydraulically sealed by a seal member 53e.

A hydraulic conduit 70A for supplying hydraulic pressure to the dedicated support hydraulic chamber 52A includes a tubular hydraulic conduit 71 formed on the external periphery of the lower half portion of the lower main body member 12 and communicating with the unclamping hydraulic chamber 46, a sloping hydraulic conduit 72A formed slantingly in the lower main body member 12, a short vertical hydraulic conduit 73 that is connected to the upper end of the sloping hydraulic conduit 72A, a large diameter hydraulic conduit 74 that is connected to the upper end of the vertical hydraulic conduit 73, and a horizontal hydraulic conduit 75 that connects this large diameter hydraulic conduit 74 to the dedicated support hydraulic chamber 52A.

A check valve 76 is provided at the upper end portion of the above described vertical hydraulic conduit 73, and permits supply of hydraulic pressure to the dedicated support hydraulic chamber 52A and moreover stops return discharge of hydraulic pressure therefrom, and a throttling passage 77 is provided to the check valve 76 so as to permit discharge of hydraulic pressure during the state in which reverse flow is being prevented. The check valve 76 comprises a steel ball 76a that is contacted against the upper end of the vertical hydraulic conduit 73 from above, and a compression coil spring 76b installed in a spring housing aperture 76c extending upwards from the large diameter hydraulic conduit 74 and biasing the steel ball 76a downwards (i.e. in the direction to close the valve). The above described throttling passage 77 consists of a notch whose cross section is small, and that is formed in a portion of the valve seat against which the steel ball 76a contacts. This throttling passage 77 is an element that serves a similar function to that of the throttling passage 72a of the clamp device C described above.

While this clamp device CA provides almost similar operation and advantages to those of the clamp device C described above, the operation and the advantages that are correlated with the differences in structure of the support mechanism 5A will now be explained.

When the mechanism is in the unclamped state, the charging of hydraulic pressure into the dedicated support hydraulic chamber 52A is performed by hydraulic pressure being rapidly charged via the check valve 76. Since initially, when clamping operation starts, the hydraulic pressure in the dedicated support hydraulic chamber 52A is almost maintained by the throttling passage 77, accordingly the annular pressure reception member 51A and the gripping member 2 are supported by experiencing a large hydraulic pressure (i.e. support force) received from the dedicated support hydraulic chamber 52A and the clamping hydraulic chamber 45, and thus the gripping member 2 is reliably radially expanded.

At this time, a larger support force is generated from the clamp device CA, since the thin cylindrical portion 53c receives the high hydraulic pressure of the clamping hydraulic chamber 45. And in the later stage of the clamping operation and subsequently, since the hydraulic pressure in the dedicated support hydraulic chamber 52A decreases gradually to drain pressure with a certain time lag, accordingly a portion of the hydraulic pressure that acts on the annular pressure reception member 51A is released, amounting to just the amount of the hydraulic pressure that acts on the annular pressure reception surface 53d. Since the throttling passage 77 consisting of a notch is provided in the check valve 76, accordingly it is possible to simplify the structure of the throttling passage 77, and this is advantageous from the point of view of manufacturing cost.

As an example in which a portion of this embodiment is varied, it would also be acceptable to arrange to omit the thin cylindrical portion 53c of the annular cylindrical portion 51A, and to make the annular cylindrical portion 53A and the dedicated support hydraulic chamber 52A with the same structure as in the clamp device C.

Embodiment 3

Figure 8:
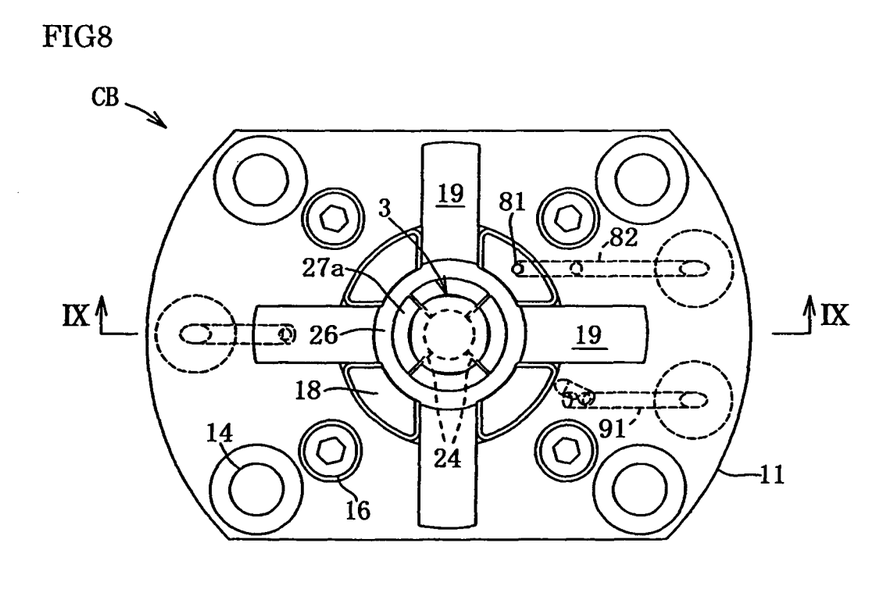
FIG. 8 is a plan view of a clamp device according to a third embodiment.
Figure 9:
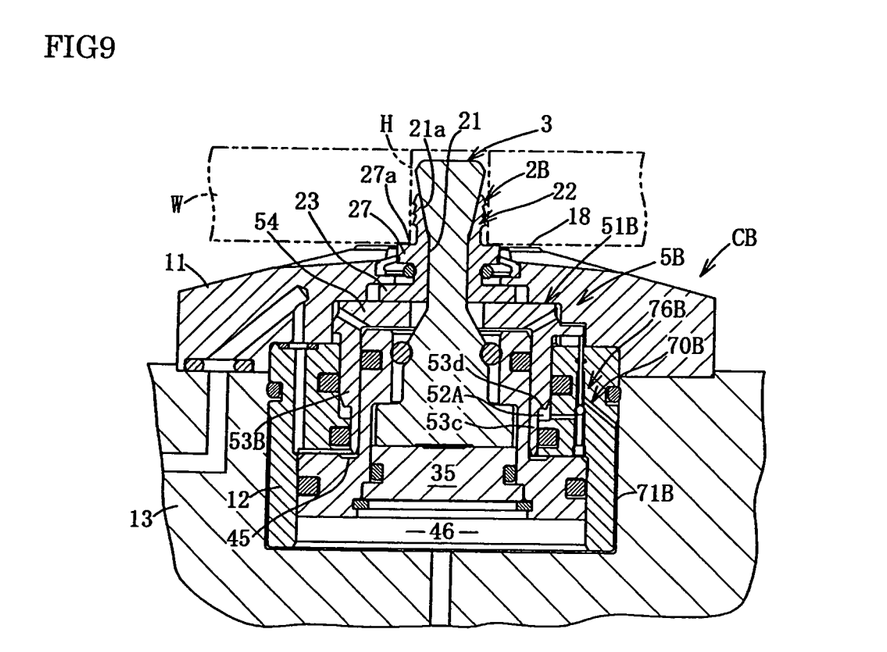
FIG. 9 is a sectional view of FIG. 8 along lines IX-IX.
Figure 10:
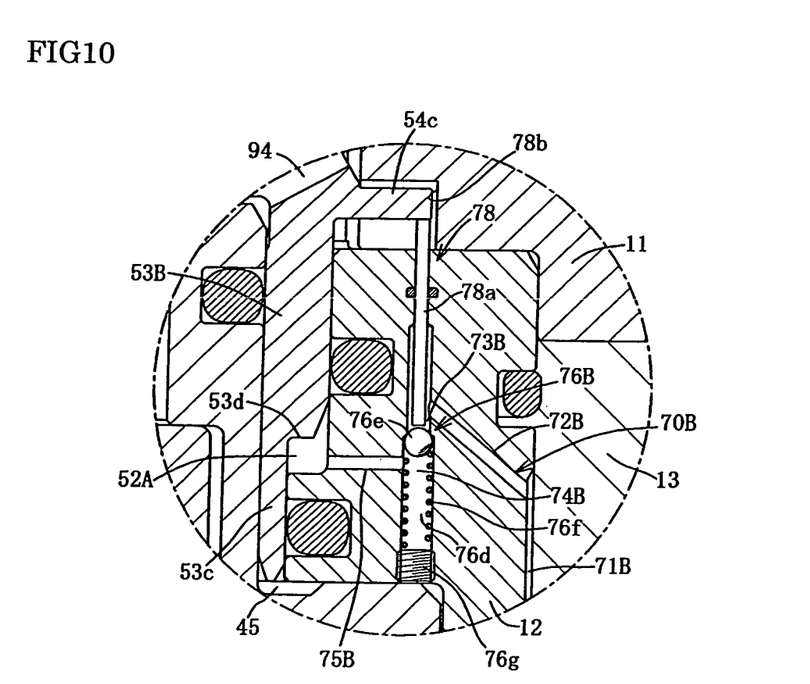
FIG. 10 is an enlarged view of a portion of FIG. 9 around a dedicated support hydraulic chamber.

A clamp device CB according to the third embodiment will now be explained on the basis of FIGS. 8 through 10.

Since, in this clamp device CB, only the structure of the gripping member 2B and the structure of the support mechanism 5B are changed, accordingly in the figures the same reference numerals will be appended to structures that are the same as structures of the clamp devices C and CA described above, and explanation thereof will be omitted, with only the structures that are different being explained.

An annular flange portion 27 is formed integrally at the intermediate portion of the gripping member 2B, and a workpiece mounting surface 27a is formed on the upper surface of this annular flange portion 27. This gripping member 2B is also divided into four portions by four slits 24. During the unclamped state, the workpiece mounting surface 27a is positioned approximately 0.2 to 0.4 mm above the seating surface 18, and the loaded workpiece W is supported by the workpiece mounting surface 27a. And, in the clamped state, the workpiece mounting surface 27a is positioned at the same position as the seating surface 18, or further in the clamping direction than the seating surface 18 (i.e., below it), and the workpiece W is supported by the seating surface 18.

The support mechanism 5B comprises an annular pressure reception member 51B and a support hydraulic chamber that applies hydraulic pressure to this annular pressure reception member 51B in the direction opposite to the clamping direction. This support hydraulic chamber comprises a dedicated support hydraulic chamber 52A and a clamping hydraulic chamber 45. A thin cylindrical portion 53c provided on the annular cylindrical portion 53B of the annular pressure reception member 51B, an annular pressure reception surface 53d, and a dedicated support hydraulic chamber 52A are structured in a similar manner to those of the clamp device CA described above.

Next, a hydraulic conduit 70B formed in the lower main body member 12 for supplying hydraulic pressure to the dedicated support hydraulic chamber 52A, a check valve 76B that is interposed partway along the hydraulic conduit 70B, and a check valve opening mechanism 78 that is operated by the annular pressure reception member 51B to open the check valve 76B, will be explained.

The hydraulic conduit 70B described above comprises a tubular hydraulic conduit 71B formed on the external periphery of the lower half portion of the lower main body member 12 and communicating with the unclamping hydraulic chamber 46, a sloping hydraulic conduit 72B formed slantingly in the lower main body member 12, a short vertical hydraulic conduit 73B extending downwards from the upper end of the sloping hydraulic conduit 72B, a large diameter hydraulic conduit 74B connected to the lower end of this vertical hydraulic conduit 73B, and a horizontal hydraulic conduit 75B that connects this large diameter hydraulic conduit 74B to the dedicated support hydraulic chamber 52A.

A check valve 76B that permits supply of hydraulic pressure to the dedicated support hydraulic chamber 52A and that moreover prevents reverse discharge of hydraulic pressure is provided at the upper end portion of the large diameter hydraulic conduit 74B. This check valve 76B comprises a steel ball 76e that is contacted against the lower end of the vertical hydraulic conduit 73B from below, and a compression coil spring 76f, installed in a spring housing aperture 76d that extends downwards from the large diameter hydraulic conduit 74, and biasing the steel ball 76e upwards (i.e. in the direction to close the valve). It should be understood that this spring 76f is held in a spring receiving plug 76g.

This check valve opening mechanism 78 comprises an extending portion 54c formed integrally with the horizontal plate portion 54 of the annular pressure reception member 51B, an operation rod 78a installed above the steel ball 76e and oriented vertically, a recess 78b that is formed in the upper main body member 11 and that contains the extending portion 54c so that it is movable in the vertical direction, and so on. The operation rod 78a is movably installed above the steel ball 76e in a rod installation hole formed in the lower main body 12, with the upper end of the operation rod 78a contacting against the lower surface of the extending portion 54c and the lower end of the operation rod 78a confronting the top of the steel ball 76e with a minute gap between them (of approximately 0.1 to 0.3 mm).

During the unclamped state, hydraulic pressure is charged from the unclamping hydraulic chamber 46 into the dedicated support hydraulic chamber 52A via the hydraulic conduit 70B and the check valve 76B. Initially, at the start of clamping operation, until the gripping member 2B grips the inner circumferential surface of the aperture H of the workpiece W, the check valve 76B is maintained in its state of preventing reverse flow, since the gripping member 2B and the annular pressure reception member 51B are almost not lowered. Due to this, the hydraulic pressure in the dedicated support hydraulic chamber 52A is maintained, and the gripping member 2B and the annular pressure reception member 51B are supported by this hydraulic pressure acting on the annular pressure reception surface 53d and by the hydraulic pressure that acts from the clamping hydraulic chamber 45 on the thin cylindrical portion 53c.

And, since it becomes impossible for the gripping member 2B and the clamp rod 3 to shift relatively to one another when the gripping member 2B expands radially and grips the inner circumferential surface of the aperture H, accordingly the gripping member 2B, the annular pressure reception member 51B, and the operation rod 78a are lowered downwards by a minute distance at least equal to the abovementioned minute gap. As a result, the check valve 76B is opened by the check valve opening mechanism 78, and the hydraulic pressure in the dedicated support hydraulic chamber 52A becomes drain pressure, i.e. the same as the pressure in the unclamping hydraulic chamber 46. Since, for this reason, in the later stage of the clamping operation and subsequent thereto, a portion of the hydraulic pressure by which the support mechanism 5B is supported is released, accordingly the clamping force is increased in strength by just this amount.

As an example in which a portion of this embodiment is varied, it would also be acceptable to arrange to omit the thin cylindrical portion 53c of the annular cylindrical portion 51A, and to make the annular cylindrical portion 53A and the dedicated support hydraulic chamber 52A to have the same structure as in the clamp device C.

Embodiment 4

Figure 11:
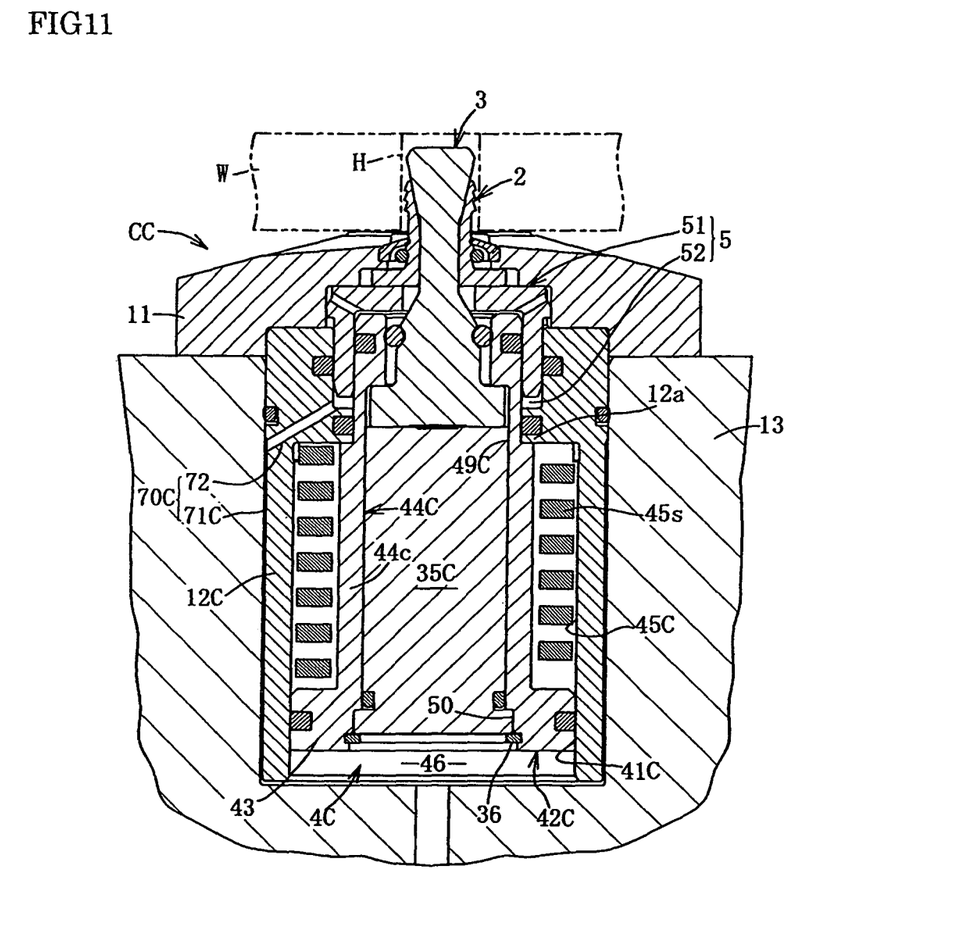
FIG. 11 is a vertical sectional view of a clamp device according to a fourth embodiment (corresponding to FIG. 2)

A clamp device CC according to the fourth embodiment will now be explained on the basis of FIGS. 11 through 13.

With this clamp device CC, the clamping hydraulic chamber 45 of the clamp device C is omitted, and instead a compression spring 45s that drives the piston member 42C in the clamping direction is provided. Thus in the figures, to structures that are the same as structures of the clamp device C described above, the same reference numerals will be appended, and explanation thereof will be omitted, with only the structures that are different being explained. It should be understood that no plan view of the clamp device CC is provided, since it would be the same as FIG. 1.

A hydraulic pressure cylinder 4C comprises a piston member 42C, an annular spring reception chamber 45C formed above a piston portion 43 of the piston member 42C, a compression spring 45s that is received in the spring reception chamber 45C and that moreover is capable of elastically biasing the piston member 42C in the clamping direction (i.e., downwards) by its spring force, and an unclamping hydraulic chamber 46 formed below the piston portion 43. It should be understood that, while this compression spring 45s for clamping is made from a spring steel wire member that is rectangular in cross section, it would also be acceptable for it to be made from a spring steel wire member that is circular in cross section.

A spring reception chamber 45C is formed so as to extend in the vertical direction, and a lower main body member 12C and a cylindrical aperture 41C are also both formed to extend in the vertical direction. A tubular piston rod 44C of the piston member 42C is also formed to extend in the vertical direction, and approximately the lower two thirds portion of the tubular piston rod 44C is formed as a large diameter rod portion 44c somewhat greater in diameter, with the spring reception chamber 45C being defined around the external circumference of this large diameter rod portion 44c. The compression spring 45s is installed in this spring reception chamber 45C in a compressed state, and biases the piston member 42C downwards. FIG. 11 shows the unclamped state, and in this unclamped state the upper end portion of the large diameter rod portion 44c is engaged with a ledge portion 12a of the lower main body member 12C.

A medium diameter hole 49C of the piston member 42C is formed to extend in the vertical direction, with a blocking member 35C that is elongated vertically being installed in the greater portion of this medium diameter hole 49C and in a large diameter hole 50, and with this blocking member 35C being contacted against the lower end of the clamp rod 3 and the blocking member 35C being prevented from coming out by a stop ring 36. The support mechanism 5 that supports the gripping member 2 is the same as the support mechanism of the clamp device C, and the support hydraulic chamber of this support mechanism 5 consists of a dedicated support hydraulic chamber 52, with a hydraulic conduit 70C that supplies hydraulic pressure to this dedicated support hydraulic chamber 52 from the unclamping hydraulic chamber 46 comprising a tubular hydraulic conduit 71C and a sloping hydraulic conduit 72.

However, no throttling passage is provided in the sloping hydraulic conduit 72. In other words, in the unclamped state, the compression spring 45s is in its state of being compressed to its maximum limit, as shown in FIG. 11. When clamping operation starts and when the hydraulic pressure in the unclamping hydraulic chamber 46 is changed over to drain pressure, since the compression spring 45s expands, the hydraulic pressure in the unclamping hydraulic chamber 46 gradually decreases, and, since the hydraulic pressure in the dedicated support hydraulic chamber 52 also gradually decreases, accordingly the gripping member 2 is supported by the hydraulic pressure that acts on the annular pressure reception member 51, and it is possible for the gripping member 2 to be radially expanded. And, after this radial expansion of the gripping member 2 (i.e. in the later stage of the clamping operation and subsequent thereto), since the hydraulic pressure in the dedicated support hydraulic chamber 52 also becomes drain pressure, accordingly it is possible to release all of the hydraulic pressures in the support mechanism 5.

Figure 12:
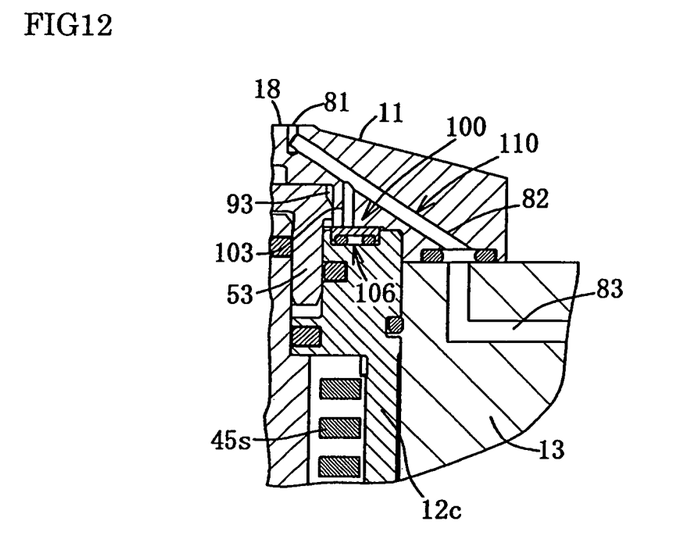
FIG. 12 is a vertical sectional view of a clamping operation confirmation mechanism portion of the clamp device of FIG. 11.
Figure 13:
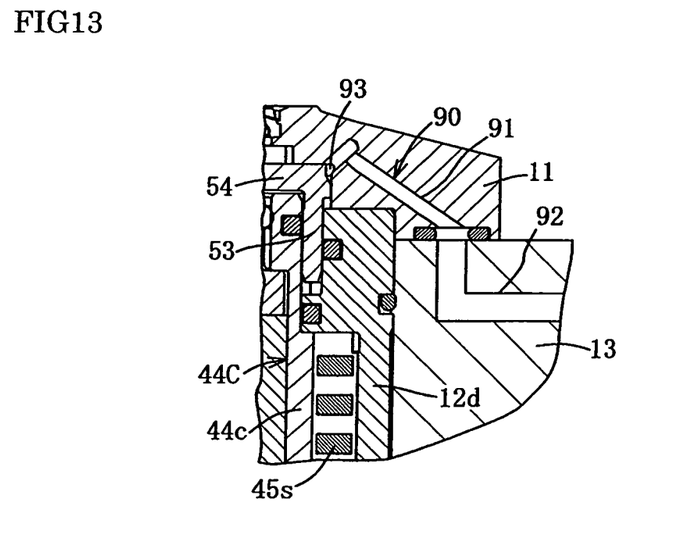
FIG. 13 is a partial vertical sectional view showing an air conduit for cleaning of the clamp device of FIG. 11.

It should be understood that explanation of the clamping operation confirmation mechanism 100 shown in FIG. 12 and also of the cleaning air conduit 90 shown in FIG. 13 will be omitted, since these structures are the same as those in the clamp device C.

Since, with this clamp device CC, it is arranged for the clamping force to be generated by the biasing force of the compression spring 45s, accordingly it is possible to perform machining of the workpiece W in the state in which, after the workpiece W has been fixed, the clamp device CC is separated from the hydraulic pressure supply. For this reason, the range of uses to which this clamp device CC can be applied is increased. Apart from this, similar operation and advantages are obtained to those of the clamp device C described above.

As an example in which a portion of this embodiment is varied, it would also be acceptable to arrange to employ a structure including a hydraulic conduit, a check valve, a check valve opening mechanism and so on, as in the support mechanism 5A or 5B of the second or the third embodiment.

With the clamp devices detailed in the first through the fourth embodiments described above, the constructions of the gripping members, the constructions of the clamp rods, the constructions of the support mechanisms, and so on are only shown by way of example; various changes could be implemented to these constructions, provided that the gist of the present invention is not deviated from. Moreover, it would also be possible to implement various changes for the other structures of these clamp devices, provided that the gist of the present invention is not deviated from.

For supplying a workpiece having a plurality of apertures, such as a cover of a case member for various types of mechanical device, to machining in a clamped state, the present invention can be employed as a clamp device by utilizing this plurality of apertures.

EXPLANATION OF THE REFERENCE NUMERALS

C, CA, CB, CC: clamp devices
1: clamp main body
2, 2B: gripping members
3: clamp rod
4: hydraulic pressure cylinder (drive means)
5, 5A, 5B: support mechanisms
11: upper main body member portion
12: lower main body member portion
18: seating surface
27a: workpiece mounting surface
45: clamping hydraulic chamber
45s: compression spring
46: unclamping hydraulic chamber
51, 51A, 51B: annular pressure reception members
52: dedicated support hydraulic chamber
70, 70A, 70B: hydraulic conduits
76, 76B: check valves
77: throttling passage
78: check valve actuation mechanism

The invention claimed is:
1. A clamp device comprising:
a clamp main body,
a gripping member which is expandable and contractible in a radial direction and is inserted into an aperture in a workpiece and can grip an inner circumferential surface of the aperture,
a clamp rod including a tapered shaft portion fitted into and engaged with said gripping member,
a drive means for driving said clamp rod forwards and backwards in an axial direction and for driving said gripping member forwards and backwards along said axial direction,
a support mechanism that supports said gripping member by fluid pressure during radial expansion of said gripping member; and a fluid pressure release means that, when said clamp rod is driven by said drive means to perform clamping, releases all or a part of the fluid pressure of said support mechanism after radial expansion of said gripping member.

2. The clamp device according to claim 1, wherein said support mechanism comprises an annular pressure reception member that supports a base end of said gripping member, and a supporting fluid chamber that applies fluid pressure to an annular cylindrical portion of the annular pressure reception member in a direction opposite to a clamping direction.

3. The clamp device according to claim 2, wherein
said drive means comprises a clamping fluid chamber for driving said clamp rod in the clamping direction, and an unclamping fluid chamber for driving said clamp rod in an unclamping direction; and
said supporting fluid chamber consists of a dedicated supporting fluid chamber formed independently from said clamping fluid chamber.

4. The clamp device according to claim 2, wherein
said drive means comprises a clamping fluid chamber for driving said clamp rod in the clamping direction, and an unclamping fluid chamber for driving said clamp rod in an unclamping direction; and
said supporting fluid chamber comprises a dedicated supporting fluid chamber formed independently from said clamping fluid chamber.

5. The clamp device according to claim 2, wherein
said drive means comprises a compression spring for driving said clamp rod in the clamping direction, and an unclamping fluid chamber for driving said clamp rod in an unclamping direction; and
said supporting fluid chamber comprises a dedicated supporting fluid chamber formed within the clamp main body.

6. The clamp device according to claim 3, further comprising a fluid passage formed in said clamp main body for supplying fluid pressure to said dedicated supporting fluid chamber, and a throttling passage formed in said fluid passage.

7. The clamp device according to claim 3, further comprising a fluid passage formed in said clamp main body for supplying fluid pressure to said dedicated supporting fluid chamber, a check valve provided in said fluid passage that permits supply of fluid pressure to said dedicated supporting fluid chamber and that prevents reverse discharge of fluid pressure, and a throttling passage that permits discharge of fluid pressure when said check valve is in the reverse flow prevention state.

8. The clamp device according to claim 3, wherein a seating surface on which the workpiece that is to be the subject of clamping is seated is provided at an end portion of said clamp main body in the unclamping direction, and a workpiece mounting surface is provided to said gripping member that, during an unclamped state, is positioned more in the unclamping direction than said seating surface and, during the clamping operation, is positioned at the same position as said seating surface, or more in the clamping direction than said seating surface.

9. The clamp device according to claim 8, further comprising a fluid passage formed in said clamp main body for supplying fluid pressure to said dedicated supporting fluid chamber, a check valve provided in said fluid passage that permits supply of fluid pressure to said dedicated supporting fluid chamber and that prevents reverse discharge of fluid pressure, and a check valve opening mechanism that is operated by said annular pressure reception member and opens said check valve, when during said clamping operation the workpiece mounting surface comes to the same position as the seating surface.

10. The clamp device according to claim 6, wherein an end portion opposite to said dedicated supporting fluid chamber of the fluid passage formed in said clamp main body is communicated with said unclamping fluid chamber.

11. The clamp device according to claim 4, further comprising a fluid passage formed in said clamp main body for supplying fluid pressure to said dedicated supporting fluid chamber, and a throttling passage formed in said fluid passage.

12. The clamp device according to claim 4, further comprising a fluid passage formed in said clamp main body for supplying fluid pressure to said dedicated supporting fluid chamber, a check valve provided in said fluid passage that permits supply of fluid pressure to said dedicated supporting fluid chamber and that prevents reverse discharge of fluid pressure, and a throttling passage that permits discharge of fluid pressure when said check valve is in the reverse flow prevention state.

13. The clamp device according to claim 4, wherein a seating surface on which the workpiece that is to be the subject of clamping is seated is provided at an end portion of said clamp main body in the unclamping direction, and a workpiece mounting surface is provided to said gripping member that, during an unclamped state, is positioned more in the unclamping direction than said seating surface and, during the clamping operation, is positioned at the same position as said seating surface, or more in the clamping direction than said seating surface.

14. The clamp device according to claim 7, wherein an end portion opposite to said dedicated supporting fluid chamber of the fluid passage formed in said clamp main body is communicated with said unclamping fluid chamber.

15. The clamp device according to claim 9, wherein an end portion opposite to said dedicated supporting fluid chamber of the fluid passage formed in said clamp main body is communicated with said unclamping fluid chamber.

16. A clamp device comprising:
a clamp main body;
a gripping member which is expandable and contractible in a radial direction and is inserted into an aperture in a workpiece and can grip an inner circumferential surface of the aperture;
a clamp rod including a tapered shaft portion fitted into and engaged with said gripping member;
a drive means for driving said clamp rod forwards and backwards;
a support mechanism that supports said gripping member by fluid pressure during radial expansion of said gripping member; and
a fluid pressure release means that, when said clamp rod is driven by said drive means to perform clamping, releases all or a part of the fluid pressure of said support mechanism after radial expansion of said gripping member; and
wherein said support mechanism comprises an annular pressure reception member that supports a base end of said gripping member, and a supporting fluid chamber that applies fluid pressure to an annular cylindrical portion of the annular pressure reception member in a direction opposite to a clamping direction;
wherein said drive means comprises a clamping fluid chamber for driving said clamp rod in the clamping direction, and an unclamping fluid chamber for driving said clamp rod in an unclamping direction;

wherein said supporting fluid chamber consists of a dedicated supporting fluid chamber formed independently from said clamping fluid chamber; and wherein a seating surface on which the workpiece that is to be the subject of clamping is seated is provided at an end portion of said clamp main body in the unclamping direction, and a workpiece mounting surface is provided to said gripping member that, during an unclamped state, is positioned more in the unclamping direction than said seating surface and, during the clamping operation, is positioned at the same position as said seating surface, or more in the clamping direction than said seating surface; and further comprising a fluid passage formed in said clamp main body for supplying fluid pressure to said dedicated supporting fluid chamber, a check valve provided in said fluid passage that permits supply of fluid pressure to said dedicated supporting fluid chamber and that prevents reverse discharge of fluid pressure, and a check valve opening mechanism that is operated by said annular pressure reception member and opens said check valve, when during said clamping operation the workpiece mounting surface comes to the same position as the seating surface.

17. The clamp device according to claim 16, wherein an end portion opposite to said dedicated supporting fluid chamber of the fluid passage formed in said clamp main body is communicated with said unclamping fluid chamber.

\* \* \* \* \*